July 16, 1957 T. R. DAMES ET AL 2,799,552
RECORDER
Original Filed Feb. 19, 1949 5 Sheets-Sheet 1

INVENTORS
TRENT R. DAMES
WILLIAM W. MOORE
JOHN W. MALONEY
BY
ATTORNEY.

INVENTORS
TRENT R. DAMES
WILLIAM W. MOORE
JOHN W. MALONEY

ATTORNEY

United States Patent Office 2,799,552
Patented July 16, 1957

2,799,552

RECORDER

Trent R. Dames, San Marino, William W. Moore, Belvedere, and John W. Maloney, Alhambra, Calif.

Original application February 19, 1949, Serial No. 77,382, now Patent No. 2,656,718, dated October 27, 1953. Divided and this application October 19, 1953, Serial No. 386,714

2 Claims. (Cl. 346—112)

The present invention relates to tape recorders and is illustrated as applied to a materials testing machine for determining the shearing strength of soil samples taken from different locations and depths at the site of a proposed structure, or for ascertaining the frictional values of soil against some other material, so that accurate and reliable data can be formulated as to the load-bearing capacity or sliding characteristics of the soil.

The present application is a division of our original application filed February 19, 1949, Serial No. 77,832, for Soil Shear Testing Machine, now Patent No. 2,656,718, issued October 27, 1953. It will be understood that the recorder disclosed and claimed herein has many applications and that the application to the present testing machine is merely illustrative.

Briefly, our patented soil testing machine comprises a surcharge mechanism for applying a predetermined constant surcharge pressure, or axial compression force, to a cylindrical soil sample and a shearing deflection and load mechanism for exerting a shearing force to the axially compressed sample. The surcharge pressure is applied to the sample through the medium of a lead screw driven by a reversible electric motor. Application of the shearing load to the sample is accomplished through a shearing load spring connected at one end to a spring carriage which is mounted on a pair of lead screws driven by a reversible electric motor.

A more detailed description of this testing machine may be had by reference to our aforementioned patent. Suffice it to say here that the object of the present invention is the provision of a novel and improved recorder mechanism capable of accurately recording the surcharge vs. shearing load and deflection vs. load relationships obtained in the sample during the progress of the test.

In its preferred form, the recorder mechanism of the present invention comprises two spaced units which extend across the top of the patented soil testing machine transverse to the direction in which the load spring carriage travels to apply a shear load to the sample. Each of these units consists of an endless bronze tape trained around two pulleys, and mounting three stylus carriers. The two recorder units are disposed directly above a sheet of coordinate paper attached to a data board mounted on the spring carriage, and these units are tilted about their longitudinal axes so that the lower straight edge of each unit is spaced closely adjacent to the surface of the coordinate paper. As the stylus carriers travel along this lower edge of the unit, in a direction at right angles to the direction of spring carriage movement, the spring-retracted stylus pins associated therewith are engaged and pressed downwardly at predetermined time intervals by a vertically movable, solenoid-actuated striker bar, causing the pins to make dots on the sheet of coordinate paper. The pulleys of the recorder units are shaft-driven from the power transmission systems driving the surcharge lead screws and the shearing deflection lead screw shaft, respectively; hence the position of each dot formed by the stylus pins is a function of the distance traveled by the spring carriage, and the amount by which either the screw shaft or the surcharge lead screw has advanced from its initial position. The distance traveled by the spring carriage gives the tension of the shearing load spring, while the advance of the screw shaft and surcharge lead screw denote the shearing deflection and surcharge pressure, respectively. The time factor in the test is also represented graphically by the spacing between dots, inasmuch as the dots are made at predetermined time intervals.

The foregoing and other objects and advantages of the invention will become apparent to those skilled in the art upon consideration of the following detailed description of the preferred embodiment thereof, reference being had to the accompanying drawings, wherein.

Figure 1:
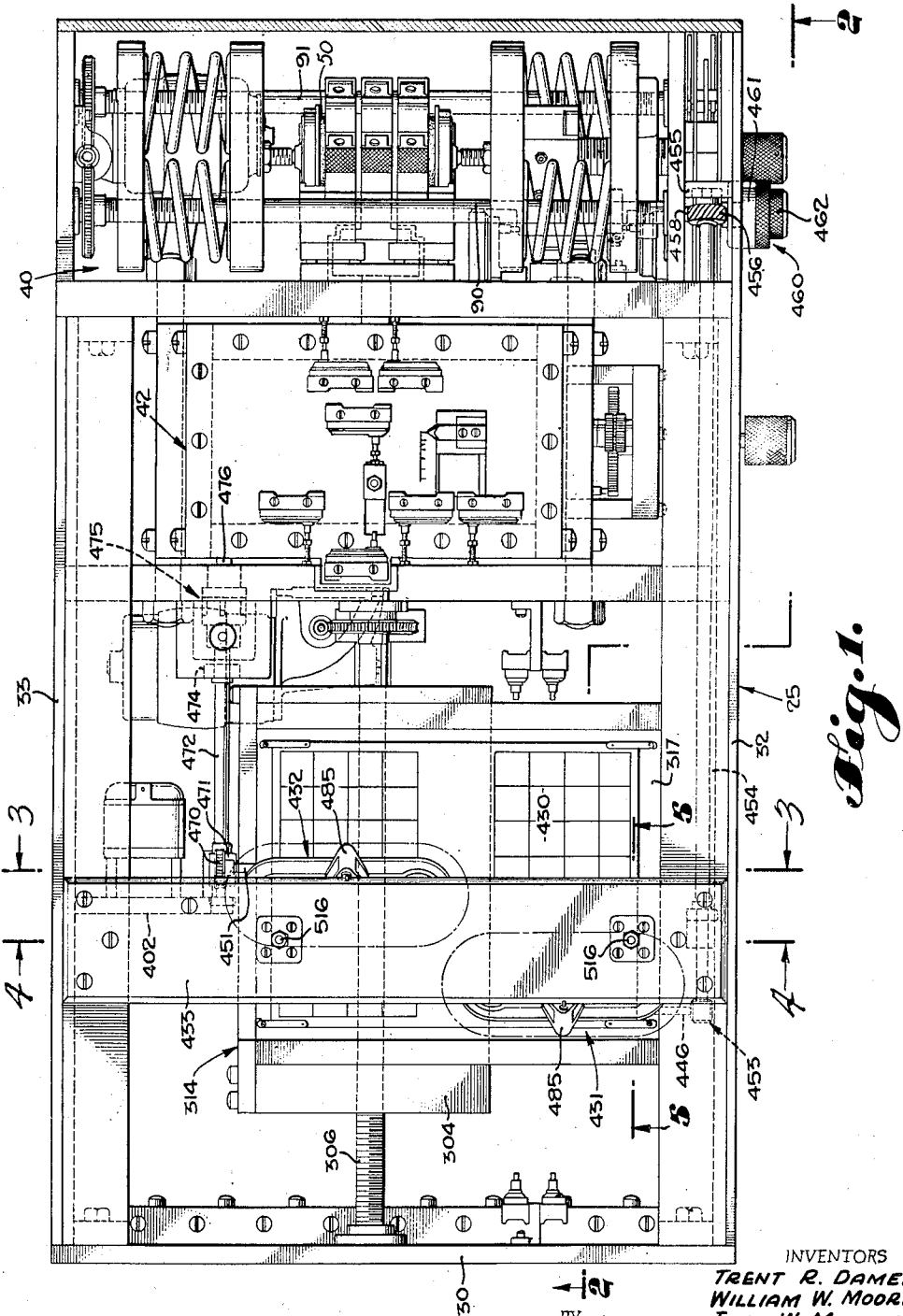
Figure 1 is a top plan view of a machine embodying the principles of the invention, the cover plate of the machine being removed to expose the internal mechanism thereof.

Briefly, our prior testing machine comprises a housing 25 which encloses the operating mechanism, and which is supported on a stand 26 formed of horizontal channel beams 27 that are bolted or otherwise secured to the top end of four legs 28 located at the corners of the machine. The housing 25 consists of a horizontal bottom plate 29 resting on and secured to the channels 27 of the supporting frame, together with end plates 30 and 31, front plate 32, back plate 33 and top plate 34. The bottom plate 29 and lefthand end plate 30 are preferably made of metal, but the top plate 34, right hand end plate 31, and front and back plates 32, 33 may be made of transparent plastic, if desired, so that the mechanism inside the machine can be observed during the performance of a test.

The mechanism contained within the housing 25 may be grouped into four primary units: the surcharge mechanism 40 which has the function of applying a surcharge, or end pressure on the sample; the shearing deflection mechanism, not shown, which is contained within a floating shear box 42 and produces a lateral displacement of the center section of the three-segment sample, perpendicular to the axis of the sample; the shearing load mechanism 43, which functions to apply a load on the floating shear box 42 balancing the resistance of the sample to shearing deflection; and the recorder unit 44, which records the shearing deflection vs. load and surcharge vs. load relationships obtained in the sample during the performance of the test.

As will be clear from a reading of our prior patent, surcharge pressure, or an axial compressive force is applied to the cylindrical soil sample 50, during operation of the machine, by rotation of a pair of lead screws 90 and 91 in the surcharge mechanism 40. Similarly, a shearing force is applied to the sample, through the shear box 42 and shearing deflection mechanism therein, by rotation of lead screws 306 in the shearing load mechanism 43.

This shearing load mechanism further comprises a screw plate 304, attached to which is the spring carriage 314. This carriage is moved to the right and left, as viewed in Figure 2, by rotation of the lead screws 306. Movement of the spring carriage 314 to the left stretches the shearing load spring 294 to apply a load on the floating shear box 42. The shearing deflection mechanism, not shown, contained within the floating shear box 42, comprises screw means which are operated by rotation of the shaft 472 to produce lateral displacement, or shearing deflection, of the center section of the sample 50 relative to its end sections. The resistance to shearing deflection of the sample is balanced by the load applied to the shear box 42 by the stretched load spring 294.

As preliminarily indicated, and as discussed more fully in our prior patent, therefore, the position of the spring carriage 314 is indicative of the tension of the load spring 294, and, accordingly, of the shear load on the sample, while the revolutions of the surcharge lead screw 90 and shear deflection shaft 472, from their initial positions, are indicative, respectively, of the surcharge pressure on, and shearing deflection of the sample. Fixedly mounted on and movable with the spring carriage 314 is the data board 317 comprising a part of the present recorder 44.

This rather brief description of the testing machine is believed adequate to a clear understanding of the present recorder mechanism. If necessary, however, reference should be had to the complete description of the machine contained in our issued patent. For facility of cross-reference, the same numerals apply in both cases.

During the operation of the patented machine, the results of the tests are recorded by the present recorder mechanism 44 on a sheet 430 of coordinate paper which is attached by spring clips to the top surface of the data board 317. The recorder mechanism 44 consists of two separate units 431 and 432 which are mounted on a bridge member 433 extending from front to rear across the top of the machine. Unit 431 is operatively connected to the surcharge mechanism 40, and gives the surcharge vs. load relationship during the progress of the test; while unit 432 is operatively connected to the shearing deflection shaft 472, and gives the deflection vs. load relationship.

Figure 5:
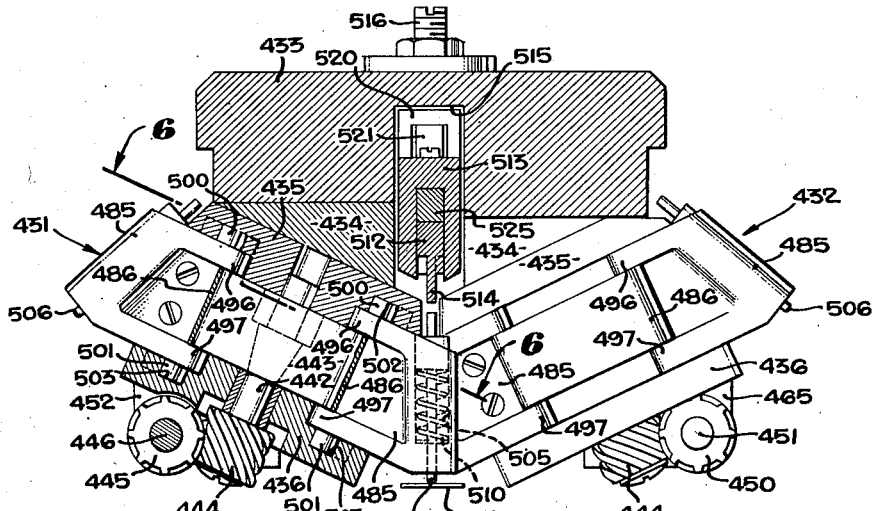
Figure 5 is an enlarged sectional view through the recorder mechanism, taken at 5—5 in Figure 1.

The two units 431, 432 are spaced apart from one another both longitudinally and laterally, as shown in Figure 1, and are secured to oppositely facing, wedge-shaped blocks 434 on the under side of the bridge 433, so that the units are tilted in opposite directions about their longitudinal axes, with their low sides overlapping, as shown in Figure 5. The two units 431, 432 are identical in all respects except as to the drive, and the following description of unit 431 will therefore be understood to apply equally to unit 432.

Figure 6:
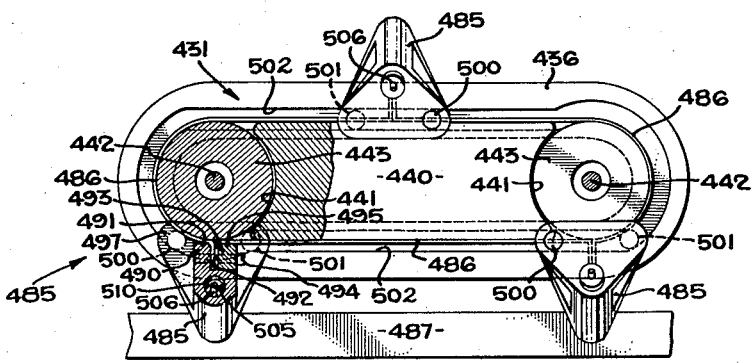
Figure 6 is a sectional view through one of the recorder units, taken at 6—6 in Figure 5; showing one of the stylus carriers at the point of leaving the inked ribbon at one end of the device, and another stylus moving into operative position over the ribbon at the other end thereof.
Figure 7:
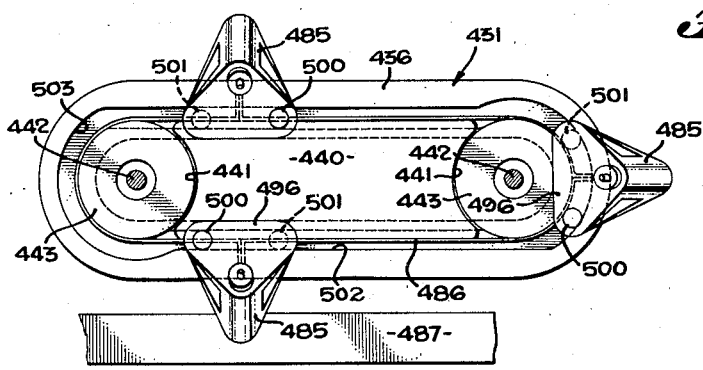
Figure 7 is a view similar to Figure 6, but showing the stylus holders in another position on the recorder unit.

The recorder unit 431 consists of top and bottom guide plates 435, and 436, which are spaced apart by a filler block 440, the ends of which are cylindrically concave at 441, as seen in Figures 6 and 7. Journalled in alined bearing holes in the plates 435 and 436 near each end thereof, are axles 442, on which are mounted pulleys 443. Each of the axles extends downwardly below the bottom guide plate 436 and has a spiral gear 444 affixed to the projecting end thereof. Meshing with the gears 444 of unit 431 are companionate spiral gears 445 on a horizontal drive shaft 446 which extends forwardly therefrom toward the front of the machine; while gears 444 of unit 432 are driven by two spiral gears 450 on another horizontal drive shaft 451 extending rearwardly toward the back of the machine.

Drive shaft 446 is supported between gears 445 in a bearing block 452 fixed to the underside of the bottom guide plate 436, and is operatively connected at its front end by spiral gears 453 (Figure 1) to a shaft 454. Shaft 454 extends to the right and is rotatably supported at its right hand end in a bearing block 455. Mounted on the shaft 454 adjacent the bearing block 455 is a spiral gear 456 which meshes with another spiral gear, not shown, that is journalled on a spindle extension 458 of the top lead screw 90 in the surcharge mechanism.

The latter spiral gear is adapted to be disconnectably coupled to the spindle extension for rotation therewith by means of a friction clutch 460, comprising an outer housing 461 and central knob 462. The friction clutch 460 is preferably a cone clutch, the operating parts of which are engaged or disengaged by turning the knob 462 with respect to the housing 461. When the clutch is disengaged, the lead screw 90 turns without driving the shaft 454, and when the clutch is engaged, the two shafts 90 and 454 rotate together. From the foregoing, it will be seen that the pulleys 443 of the recorder unit 431 are driven by the surcharge lead screw 90, and the angular position of the pulleys is therefore determined at all times by the number of revolutions made by the lead screw 90.

Drive shaft 451 for the other recorder unit 432 is journalled between gears 450 in a bearing block 465 mounted on the underside of the bottom guide plate 436, and is rotatably supported at its back end by a bearing support block 466 on the plate 402. A gear 470 on shaft 451 meshes with a worm 471 on the shaft 472.

Thus, pulleys 443 of the recorder unit 432 are driven by the shear deflection shaft 472, and the angular position of the pulleys is determined at all times by the number of revolutions made by the shaft 472.

Each of the recorder units 431, 432 is provided with three generally triangularly shaped stylus carriers 485 mounted on a Phosphor bronze tape 486, and the latter is trained around the pulleys 443 in the manner of an endless belt. The carriers 485 are spaced apart on the tape so that the center-to-center distance between the styli is the same as the distance between the centers of the pulleys 443, and the pulleys are of a diameter such that the circumference is equal to the distance between the styli. Thus, there is always one carrier in operative position above the inked ribbon 487 which lies underneath the straight portion of the recorder unit at the low side thereof, except for the instantaneous condition shown in Figure 6, wherein one of the carriers is at the point of leaving the operative position, while the other is at the point of entering the same at the other end of the unit.

The tape 486 is preferably made up of three sections, each of which is attached at its ends to two of the stylus carriers 485. As best shown in the sectioned portion of Figure 6, the body of the carrier is formed with a vertical rib 490 having a back surface 491 and a laterally facing clamping surface 492 at right angles thereto. The corner forming the junction of the two surfaces is smoothly rounded, and the end of one of the sections of tape 486 is brought around the corner and laid flat against surface 492. The end of the next tape section is laid on top of the previously mentioned section, and the two tapes are then clamped tightly to the rib 490 by a clamp block 493 and screws 494. The back surface 495 of the clamp block 493 is coplanar with the back surface 491 of the rib, and the abutting surfaces of the tape ends between the clamping block and rib lie in a vertical plane bisecting the carrier at its lateral midpoint.

Ledges 496 and 497 extend rearwardly beyond the surfaces 491, 495 at the top and bottom of the carrier, and projecting from the top and bottom surfaces of the ledges 496, 497 respectively, are guide pins 500 and 501. Top guide pin 500 travels in a track 502 formed in the underside of the top guide plate 435, and the bottom pin 501 travels in a track 503 formed in the top side of the bottom guide plate 436. Each of the tracks 502, 503 is formed with parallel straight portions along both sides of the guide plates, which are connected at their ends by circular curved portions concentric with the axes of pulleys 443. It will be noted that the straight portions are not tangent to the circular end portions, but instead, intersect the latter at a slight distance in from the point of tangency. Each of the straight portions cuts chordwise across the circle at one end, and then enters the circle at the far side; while the other end enters the opposite circle at the point of first intersection.

The top track 502 has the same configuration as the bottom track, but is turned over with respect thereto, so that the flat side of the circle in the top track is diametrically across from the flat side of the corresponding circle in the bottom track. The purpose of this configuration and arrangement of the tracks 502 and 503 is to guide the carriers 485 by the two laterally spaced pins 500 and 501, so that the point of attachment of the carrier to the tape 486, midway between the centers of the pins, follows the path of the tape. Thus, if we assume that the tape is travelling in a clockwise direction around the unit in Figure 6, the top pin 500 (shown in phantom lines) of the lower lefthand carrier has just reached the end of the straight-line portion of the upper track 502, and has entered the circular end portion of the track. At the same time, the bottom pin 501 (shown in broken lines) has just reached the end of the straight-line portion of the lower track 503, and has likewise entered the circular end portion. It will also be noted that the point of attachment of the tape 486 to the carrier is now tangent to the lefthand pulley 443. As the carrier starts around the pulley, the leading pin 500 swings upwardly along its circular track, while the trailing pin 501 swings downwardly along its circular track, and the midpoint between the centers of the pins follows the circle of the pulley 443.

As the carrier 485 reaches the top of the pulley 443, the leading pin 500 swings up over the center of the circle and back down to the straight-line portion of its track, while the trailing pin 501 leaves its circular track and enters the straight-line portion before passing over the center of the circle.

Each of the stylus carriers 485 has a cylindrical bore 505 formed therein, the axis of which is inclined to the plane of the pulley axles 443 so that the said bores are perpendicular to the inked ribbon 487 when the carriers are at the low side of the tilted recorder unit. Slidably disposed within the bore 505 is a stylus 506 which is pressed upwardly by a spring 510. The end of the stylus 506 projects through a hole in the carrier at the bottom of the bore 505, and is adapted to contact the inked ribbon 487 when the stylus is pushed downwardly against the pressure of the spring 510.

The styli 506 of the operatively positioned carriers travelling directly above the inked ribbon 487 are punched downwardly at predetermined intervals of time, pressing the inked ribbon against the coordinate paper 430 and making a series of dots thereon which are later connected by continuous lines to produce curves representing the surcharge vs. load and shearing deflection vs. load relationships of the sample during the progress of the test. The mechanism for punching the styli consists of a ram bar 512 extending transversely across the machine beneath the bridge member 433, and supported from the latter by an inverted channel member 513. The bottom edge of the ram bar 512 is recessed back along the opposite sides thereof to clear the top guide plate 435 of the recorder unit, leaving thin ridges 514 down the center which are disposed directly above and are engageable with the top ends of the operatively positioned styli.

Figure 3:
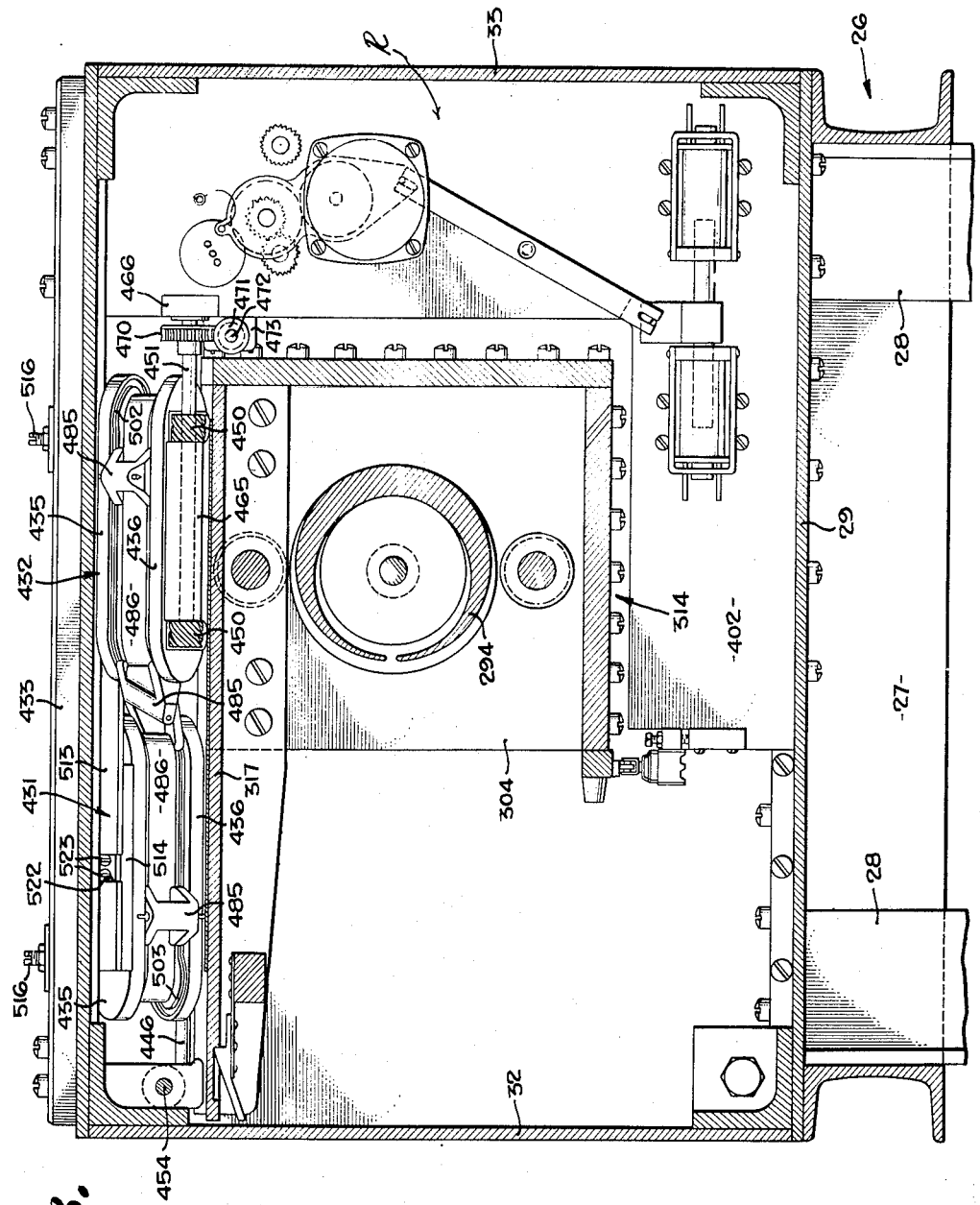
Figure 3 is a transverse vertical section through the machine, as seen along the section line 3—3 in Figure 1.

The channel member 513 is positioned within a longitudinally extending slot 515 in the under side of the bridge member 433, and is rigidly attached to the bridge by two studs 516. The ram bar 512 is slidably disposed between the side flanges of the channel member 513 and is supported by two inverted, U-shaped hangers 520 which pass up over the top of the channel member and rest upon strip spring bridges 521. The arms of the hangers 520 slide up and down within slots 522 (see Figure 3) in the outer side surfaces of the channel member 513, and the bottom ends of the hanger arms are secured by screws 523 to the ram bar 512. The spring bridges 521 provide yieldable support for the ram bar 512 to hold the latter up, clear of the styli 506, and the sliding engagement of the arms of hangers 520 within the guide slot 522 permits the ram bar to move in a vertical direction only.

Figure 4:
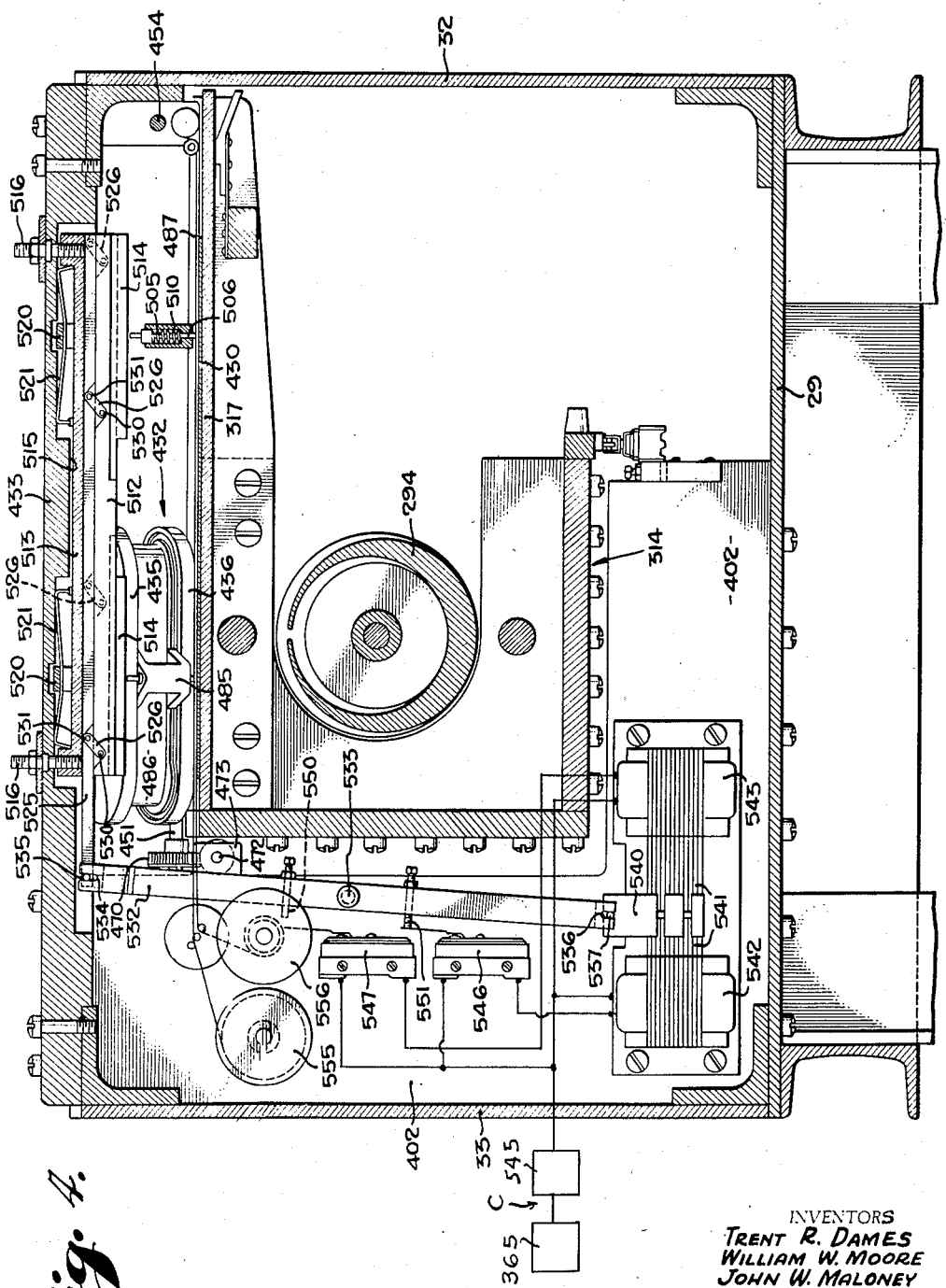
Figure 4 is another vertical section, looking in the other direction from 4—4 in Figure 1.

Slidably disposed within the member 513 between the ram bar 512 and the bottom of the channel is an actuating bar 525 which is connected to the ram bar by links 526 (Figure 4). Each of the links 526 is pivoted to the ram bar 512 by a pin 530, and to the actuating bar 525 by a pin 531, said links being normally laid over to one side or the other of the bottom pin 530, depending upon whether the bar 525 is at the righthand extremity of its travel, as in Figure 4, or at its lefthand extremity. When the bar 525 is shifted longitudinally from one of said positions to the other, the links 526 swing downwardly about pin 531 from one angular position to the other. Pin 530, being attached to the ram bar 512, can move only in a vertical direction; hence the ram bar is pushed downwardly by the links as the actuating bar is shifted lengthwise in one direction or the other, and the ridge 514 strikes the styli of the operatively positioned carriers 485, causing the styli to make dots on the coordinate paper 430.

The actuating bar 525 is shifted lengthwise from one position to the other by means of a lever 532 which is pivoted at its midpoint on a pin 533 projecting from the vertical partition member 402. The top end of the lever 532 is bifurcated to receive the projecting end of the actuating bar 525, and is slotted in from the end at 534 to receive a pin 535 extending through the bar 525 and projecting laterally from opposite sides thereof. The bottom end of the lever 532 is similarly slotted at 536, and engaged within this slot is a pin 537 projecting laterally from opposite sides of a bracket member 540 which is attached to and moves with the joined armatures 541 of two opposed solenoids 542 and 543.

The solenoids 542 and 543 are energized alternately at predetermined intervals, shifting the armatures 541 first to the left and then to the right, and rocking the lever 532 about its pivot 533. This alternate energizing of the solenoids at predetermined intervals is accomplished by an electrical control circuit c, including a timing device 365 for generating current pulses at predetermined intervals and circuit means 545 connected to switches 546 and 547, which are actuated by screws 550 and 551 on the lever 532, for transmitting the current pulses alternately to the windings of first one and then the other of the solenoids 542, 543. This control circuit, including the timer 365, circuit means 545, and the switches 546 and 547, are illustrated in Figures 18–21 of, and fully described in, our aforementioned patent. For the details of the circuit c and its operation, reference should be had to those figures and the corresponding descriptive matter of the patent. Suffice it to say here, that the solenoids 542 and 543 are alternately energized at predetermined intervals to reciprocate the ram bar 512.

The inked ribbon 487 of the recorder unit is preferably the same as that used in typewriters, and its opposite ends are attached to two spools 555 and 556. Ribbon 487 is wound from one of these spools to the other and then is reversed for winding in the opposite direction by a reversing mechanism generally indicated at R in Figure 3. For a detailed description of this mechanism, reference should be had to our prior patent.

Figure 2:
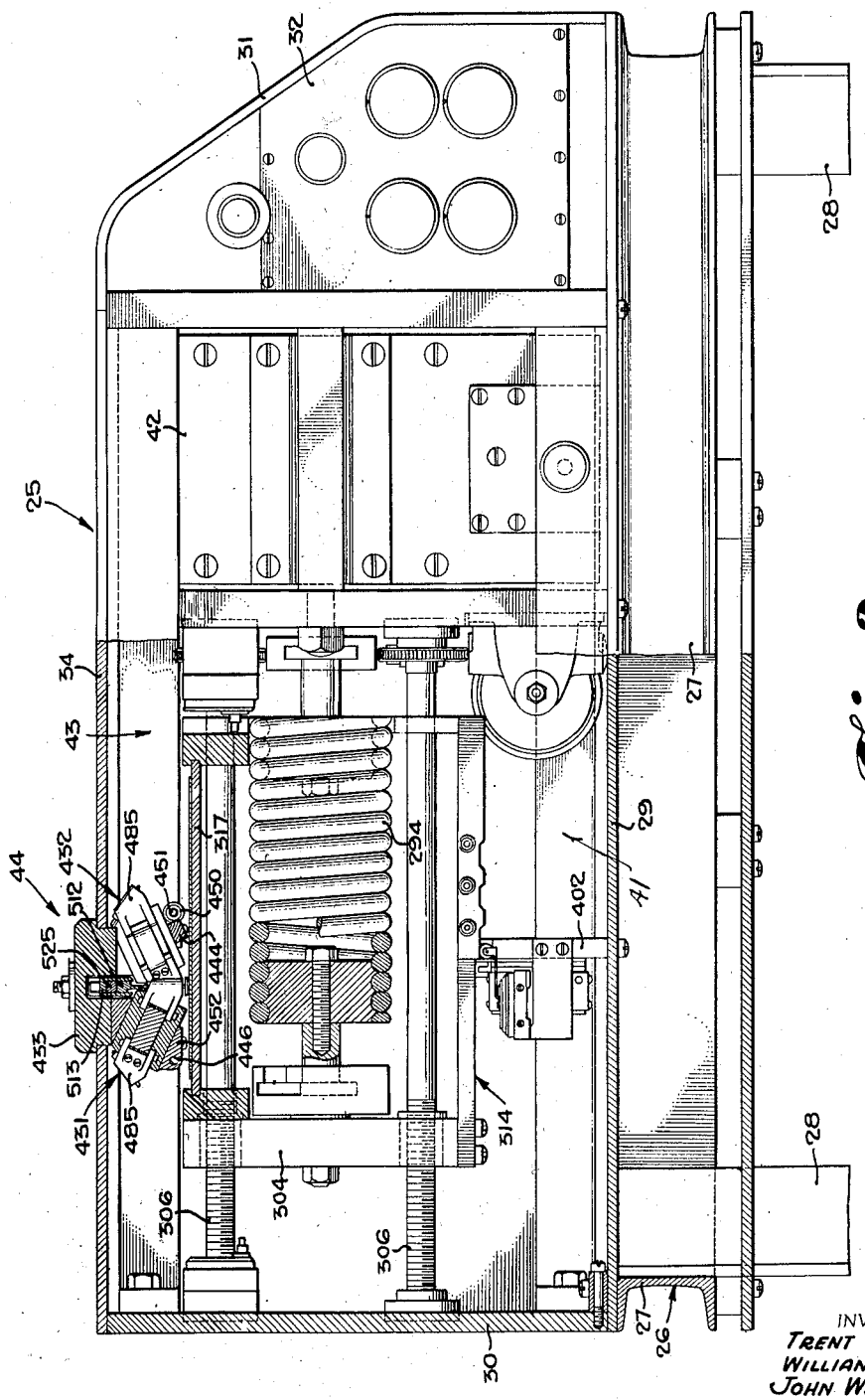
Figure 2 is a partially sectioned side elevational view of the machine, taken along the line 2—2 of Figure 1.

During operation of the machine, the data board 317 and, therefore, the coordinate paper 430, are shifted to the right or left, as viewed in Figure 2, as a function of the shear load applied to the sample through the load spring 294. Simultaneously, the styli of the recorder unit 431 are moved across the paper 430, at right angles to the direction of movement of the data board 317, as a function of the surcharge pressure applied to the sample by rotation of the surcharge lead screw 90. These styli are also periodically pressed against the typewriter ribbon 487, by the afore-described reciprocation of the ram bar 512.

There is thereby formed on the coordinate paper 430, by the recorder unit 431, a first trace or curve representing the surcharge vs. shear load relationship of the sample during the progress of the test.

Similarly, the styli of the recorder unit 432 are moved across the paper 430, at right angles to the direction of movement of the data board 317, by rotation of the shearing deflection shaft 472 and, therefore, as a function of the shearing deflection of the sample. These latter styli are also periodically pressed against the ribbon 487 by reciprocation of the ram bar 512.

There is, therefore, produced on the paper 430, by the recorder unit 432, a second trace or curve representing the shearing deflection vs. shearing load relationship of the sample during the test.

It is believed that the present recorder will be clearly understood from the foregoing, and that the many objects and advantageous features of the invention will be recognized by those skilled in the art. While we have shown and described in considerable detail what we believe to be the preferred embodiments of our invention, it is to be understood that such details are merely illustrative, and not to be considered restrictive in any sense, since many changes in the shape and arrangement of the several parts may be made without departing from the broad scope of the invention, as defined in the appended claims.

We claim:

1. A recorder unit for a testing machine of the class described having a movable data board adapted to support a sheet of coordinate paper, said data board being connected to the mechanism of the machine so that its movement is controlled by the operation of one component of the machine, said recorder unit comprising a pair of laterally spaced pulleys of equal diameter, an endless tape trained around said pulleys and extending across said data board above said paper, said tape having a length equal to exactly three times the circumference of one of said pulleys, three equidistantly spaced stylus carriers mounted on said tape and movable therewith across said sheet of paper transverse to the direction of travel of said data board, the plane of travel of said carriers being inclined to the plane of said sheet of paper, each of said carriers having a spring-retracted stylus disposed at an angle such that the stylus is vertical when the carrier is traveling along the low side of the unit, said stylus being adapted to make a mark on said paper when depressed, means operatively connected with the mechanism of the machine for driving said pulleys responsive to the operation of another component of the machine, and means for periodically depressing the stylus of the carrier traveling along the low side of the unit, so as to make a series of marks on said paper representing the relationship between the progress of said one component of the machine and that of said other component.

2. In a testing machine of the class described having a movable data board adapted to support a sheet of coordinate paper, said data board being connected to the mechanism of the machine so that its movement is controlled by the operation of one component of the machine, said recorder unit comprising a stylus carrier supported for movement across said sheet of paper transverse to the direction of travel of said data board, said carrier having a spring-retracted stylus which is adapted to make a mark on said paper when depressed, driving means for said carrier connected to the mechanism of the machine so that the movement of the carrier is controlled by the operation of another component of the machine, a ram bar disposed directly above said stylus parallel to the path of travel thereof, said ram bar being movable vertically but constrained against endwise movement, an actuating bar disposed above said ram bar and connected therewith by a plurality of swingable links, said actuating bar being slidable longitudinally between two extreme positions and being also constrained against vertical movement, said links being operable to push said ram bar downwardly when said actuating bar is moved from one position to the other, thereby depressing said stylus to make a mark on said paper, a pair of opposed, alternately actuated solenoids which are operatively connected to said actuating bar to shift the latter from one position to the other, a timer operable to send out current impulses at predetermined intervals of time, and circuit means for transmitting said current impulses alternately to the windings of first one and then the other of said solenoids.

References Cited in the file of this patent

UNITED STATES PATENTS

| | | |
|---|---|---|
| 584,497 | Eckels | June 15, 1897 |
| 1,309,720 | Doughty | July 15, 1919 |
| 2,246,003 | Rich | June 17, 1941 |
| 2,275,246 | Caldwell | Mar. 3, 1942 |
| 2,606,092 | Rich | Aug. 5, 1952 |
| 2,669,500 | Och et al. | Feb. 16, 1954 |